United States Patent
Doemens et al.

(10) Patent No.: US 6,865,960 B2
(45) Date of Patent: Mar. 15, 2005

(54) CAPACITIVE MICROSYSTEM FOR RECORDING MECHANICAL DEFORMATIONS, USE AND OPERATING METHOD

(75) Inventors: Guenter Doemens, Holzkirchen (DE); Dieter Spriegel, Munich (DE); Hans Wuensche, Penzing/Ramsach (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/355,615

(22) Filed: Jan. 31, 2003

(65) Prior Publication Data

US 2003/0115968 A1 Jun. 26, 2003

Related U.S. Application Data

(63) Continuation of application No. PCT/DE02/01169, filed on Mar. 28, 2002.

(30) Foreign Application Priority Data

Mar. 30, 2001 (DE) .......................................... 101 15 904

(51) Int. Cl.[7] .............................................. G01L 1/12
(52) U.S. Cl. ................................................. 73/862.626
(58) Field of Search ........................... 73/780, 862.626, 73/862.68, 862.381, 862.391

(56) References Cited

U.S. PATENT DOCUMENTS

| | | | | |
|---|---|---|---|---|
| 4,377,912 A | * | 3/1983 | Hakhverdian | 33/366.19 |
| 4,933,807 A | * | 6/1990 | Duncan | 361/283.2 |
| 5,023,749 A | * | 6/1991 | Hubert et al. | 361/292 |
| 5,784,190 A | * | 7/1998 | Worley | 359/291 |
| 6,633,172 B1 | * | 10/2003 | Doemens et al. | 324/661 |

FOREIGN PATENT DOCUMENTS

| | | | | |
|---|---|---|---|---|
| DE | 36 36 322 C2 | | 8/1988 | G01B/7/16 |
| DE | 42 37 072 C | | 12/1993 | G01L/1/20 |
| DE | 197 29 401 A1 | | 2/1999 | B60R/25/04 |
| DE | 198 16 936 A1 | | 10/1999 | H04B/5/00 |
| DE | 198 57 124 A1 | * | 7/2000 | G01L/1/14 |
| DE | 199 07 673 A1 | * | 8/2000 | G01B/7/16 |
| DE | 199 23 143 A1 | * | 11/2000 | G01N/27/20 |
| EP | 0 441 381 | | 8/1991 | G08B/13/26 |
| EP | 0 759 268 A1 | | 2/1997 | A01D/43/00 |
| FR | 2 309 833 | * | 4/1975 | G01B/7/22 |
| JP | 57042829 | | 3/1982 | G01L/9/12 |
| WO | 00/26608 | * | 5/2000 | G01B/7/16 |
| WO | 00/28277 | | 5/2000 | G01B/7/16 |
| WO | 00/28293 | | 5/2000 | G01L/1/14 |
| WO | 02/079740 | * | 10/2002 | G01L/1/14 |

OTHER PUBLICATIONS

Tibor L. Foldvari et al. "Capacitive Transducers" Instruments & Control Systems vol. 37. pp. 77–85.*
International Search Report PCT/DE 02/01169.*
International Supplements Form 2001P05619WOUS.*
International Written Report 2001P05819WO.*

* cited by examiner

Primary Examiner—Max Noori
(74) Attorney, Agent, or Firm—Baker Botts L.L.P.

(57) ABSTRACT

The invention relates to a capacitive microsystem, which can be used to replace conventional strain gauges used currently. The microsystem has substantial advantages with regard to handling, overload stability and endurance. Capacitive microsystems of this type can be used to record deformations and to calculate forces, torque etc. They can be used in particular to determine the weight of vehicle seats, to provide for example deployment data for an airbag.

11 Claims, 3 Drawing Sheets

W = Weight
k = elasticity constant
b = width of the electrode
Co = capacitance without weight
Cw = capacitance with weight
ho = initial opening
Eo = dielectric constant

CAPACITIVE MICROSYSTEM FOR RECORDING MECHANICAL DEFORMATIONS, USE AND OPERATING METHOD

CROSS-REFERENCE TO RELATED APPLICATION

This application is a continuation of co-pending International Application No. PCT/DE02/01169 filed Mar. 28, 2002, which designates the United States, and claims priority to German application number DE10115904.8 filed Mar. 30, 2001.

TECHNICAL FIELD OF THE INVENTION

The invention relates to a capacitive microsystem for recording mechanical deformations, to the use thereof for measuring forces and to an operating method.

BACKGROUND OF THE INVENTION

Various capacitive torque and force sensors are known in the prior art. In the industrial sector, torques are today generally measured with measuring cells which are fitted with strain gages. Strain gages are attached directly to the measuring point on a structural element. However, the adhesive attachment and contacting of strain gages proves to be technologically difficult. This is disadvantageous in particular in the case of mass production and applications in the field. Furthermore, the long-term stability and overload resistance of strain gages are not satisfactory.

Other known capacitive torque and force sensors have, for example, electrode structures that engage in one another in a comb-shaped manner. The displacements occurring in these cases are only a few micrometers. The electrode spacing is thereby altered in a way corresponding to a displacement at the measuring site. Although it is less problematical to attach sensors of this type to structural elements on which measurements are to be taken, a very high degree of accuracy in the interspacing and adjustment is required in the production of comb structures. This limits the possibility for cost reduction.

The invention is based on the object of providing an integrated capacitive microsystem which can replace previous sensors, is much easier to attach and has greater endurance and improved overload resistance.

Furthermore, a modification for use on vehicle seats and an operating method are to be specified.

The solution achieving these aims, on which the invention is based, is respectively obtained by the following:

A capacitive microsystem for recording mechanical deformations comprising:
  at least two flat electrodes set at acute angles with respect to each other, said electrodes comprising a measuring electrode and a counter electrode, wherein measuring signals result from changes in the capacitance when there is a corresponding change in the setting angle formed between the electrodes;
  an elongate bending element having a support in the form of a beam and end regions connected to said support via bending regions;
  at least one counter electrode rigidly connected to one end region of the bending element, said counter electrode interacts with the measuring electrode positioned on the support, wherein both the measuring electrode and a reference capacitor having been applied in a planar manner along with an electronic component to a glass substrate fastened on the support, and both measurement data and an energy supply being available via connections.

The invention is based on the realization that a measuring element with a greater endurance and with improved overload resistance can be created by the use of an integrated capacitive microsystem in which both the measuring electrode and a reference capacitor are applied to a glass substrate by planar technology along with an electronic component. The sensor can be produced by known, tried-and-tested production technologies and equipment. The sensor can be used in particular for measuring a force when it has been mounted on a deforming element of known mechanical properties. For measuring a force, in particular the force of a weight on a vehicle seat, seat fastenings are designed as deforming elements, to which at least one capacitive microsystem for recording mechanical deformations is respectively attached.

It is particularly advantageous to make the data and/or energy transmission contactless. For this purpose, a capacitive microsystem is respectively equipped with an induction coil, so that data can be transmitted to the outside. At the same time, the capacitive microsystem can be supplied with energy from the outside via the induction coil.

For the interaction of a number of capacitive Microsystems at a number of fastening points of a vehicle seat, an induction loop taken via each capacitive microsystem is advantageously used.

The operating mode of a capacitive microsystem is advantageously set up in such a way that it alternates between energy transmission for the system and data transmission to the outside.

BRIEF DESCRIPTIONS OF THE FIGURES

Exemplary embodiments are described below on the basis of schematic figures.

DETAILED DESCRIPTION OF THE PREFERRED EMBODIMENTS OF THE INVENTION

Figure 1:
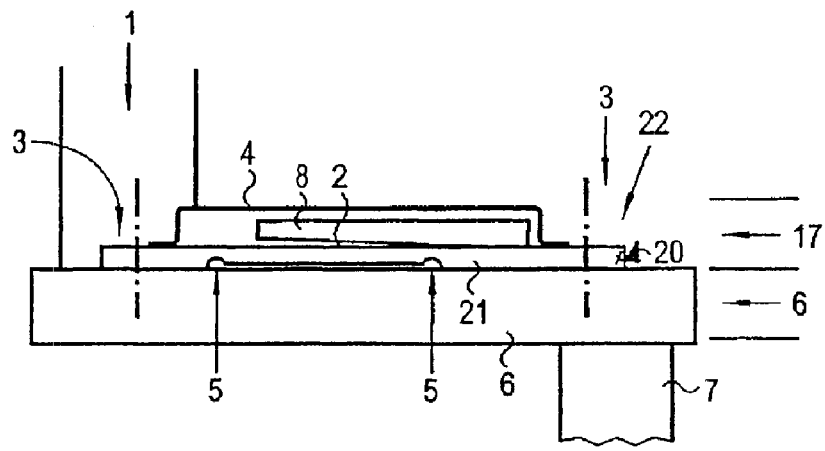
FIG. 1 shows a capacitive microsystem for recording the force of a weight in combination with a deforming element.

FIG. 1 shows a sectioned side view of a capacitive microsystem 17, which is mounted on a deforming element 6. The deforming element 6 is in turn fastened to a support 7 and is loaded on the opposite side by the force of a weight 1. At the fastening points 3, the capacitive microsystem or measuring system 17 is rigidly connected to the deforming element 6. As a result, the bending element 20 of the capacitive microsystem 17 will respond to movements, in particular flexures, of the deforming element 6 under loading by replicating them in a defined way. As a result, there is a fixed relationship between the capacitive microsystem 17 and the deforming element 6. In the capacitive microsystem 17, the end region 22 of the support 21 lying on the right in FIG. 1 remains static, since it is rigidly connected to the deforming element 6 at the fastening point 3. In its central region between the bending regions 5, the support 21 will undergo a deflection which correlates with the deformation of the deforming element 6. The measuring electrode 2 positioned on the support 21 is consequently moved in relation to the static counter electrode 8, producing a change in angle between the electrodes set at an acute angle to each other.

Figure 2:
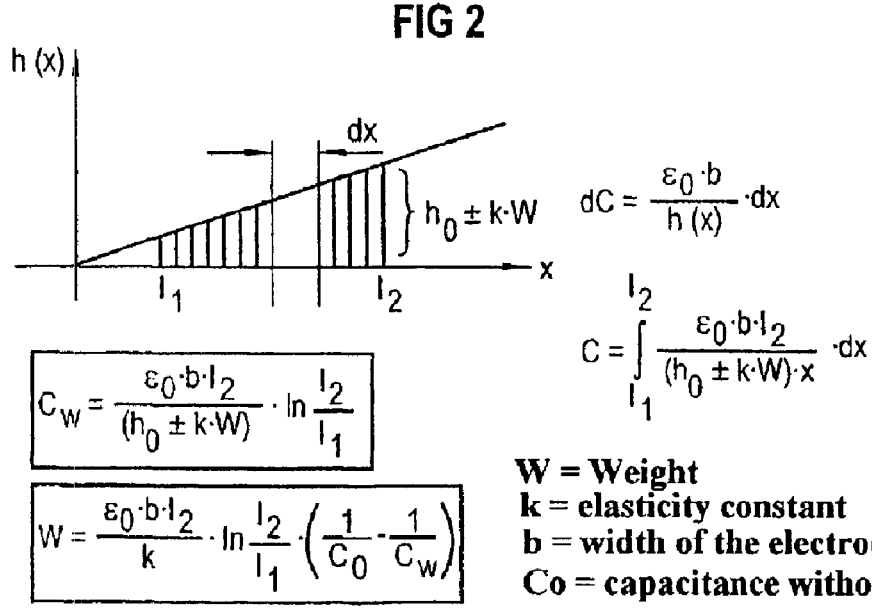
FIG. 2 shows theoretical principles for a capacitive microsystem for recording deformation and calculating the force of a weight.

In FIG. 2, a height h/displacement x diagram is represented, in which the deflection between the electrodes is considered in relation to the length of the electrodes. The transfer function of the capacitive microsystem is derived from this. The extent of the length of the measuring electrode lies in the x direction, with the end points $l_1$ and $l_2$ of the electrode indicating its effective length. The height h (x) can be represented by the product of the elasticity constant k and weight W, taking into account an initial opening $h_0$. By resolving on the basis of the weight W, the transfer function valid for the capacitive microsystem in the case of measuring the weight can be derived. The designations specifically mean: k=electricity constant, $\epsilon_0$=dielectric constant, b=width of the electrode, W=weight, C=capacitance, $l_2-l_1$= length of the electrode, with the indexing in the case of the capacitance and opening height being 0 for the state of rest and W for the operating state.

Figure 3:
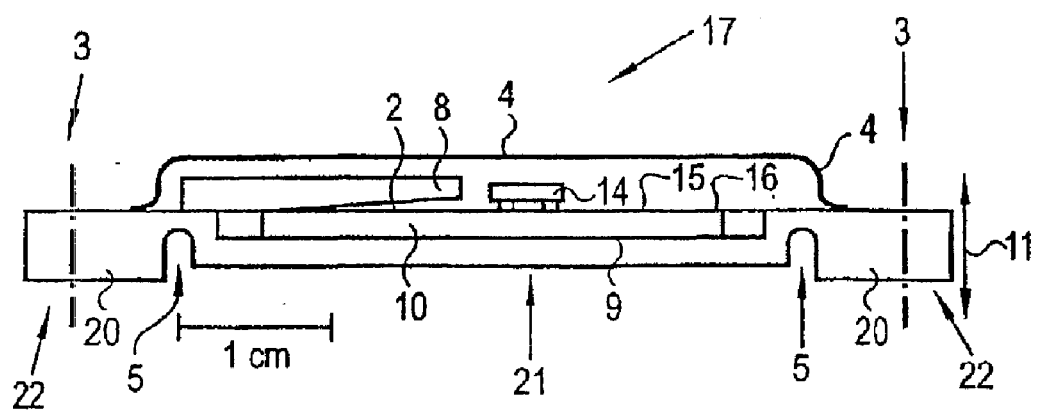
FIG. 3 shows a capacitive microsystem for recording deformation with contactless inductive power and signal transmission.
Figure 4:
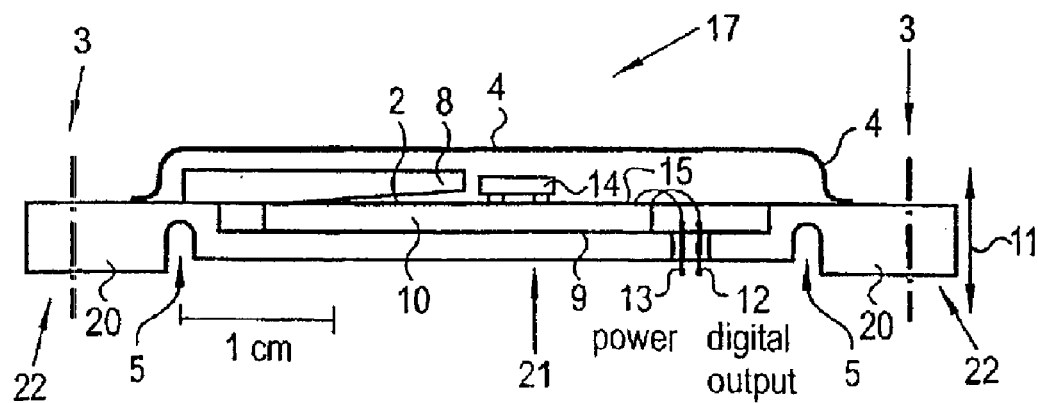
FIG. 4 shows a capacitive microsystem corresponding to FIG. 3 with electrical contacting to the outside.

FIGS. 3 and 4 show configurations of the invention, the counter electrode 8 being respectively positioned in the left-hand end region 22 of the sectioned side view of the capacitive microsystem 17. Respectively represented in both figures is a bending element 20, which comprises a central support 21 with end regions 22 on both sides, which are connected to the central support 21 via bending regions 5. The end region 22, to which the counter electrode 8 is rigidly connected, is rigidly connected via the fastening point 3 to a deforming element 6 not represented in FIGS. 3 and 4. A force acting in the force direction 11 is responsible for a flexure between the left-hand and right-hand end regions 22 of the bending element 20. In FIGS. 3 and 4, the end region 22 represented on the right in the figure is likewise firmly connected to the deforming element 6 via the fastening point 3. This connection may have more degrees of freedom than the connection of the end region 22 on the left-hand side of the bending element 20. What is important is that the right-hand end region 22 of the bending element 20 uniformly replicates movements of a deforming element 6. For this purpose, it is necessary to establish at the fastening point 3 a connection between the bending element 20 and the deforming element 6 which fixes the two elements with respect to each other in such a way that they move substantially parallel to each other when there is a flexure of the deforming element.

FIG. 3 shows a configuration of the invention in which both the measuring electrode 2 and an electronic component 14 as well as a reference capacitor 15 and a coil 16 have been applied to a glass substrate 10, which is fastened on the support 21 by means of a layer of adhesive 9. The measuring electrode 2, reference capacitor 15 and coil 16 are formed by planar technology, in particular a thin-film technique. The electronic component 14 has preferably been applied by flip-chip technology, i.e. direct mounting, to the correspondingly prepared surface of the glass substrate 10. The positioning of the glass substrate 10 with the corresponding components mounted on it takes place in such a way that the measuring electrode 2 interacts with the counter electrode 8. Since substantially the same production technology is consequently used for the reference capacitor as for the measuring capacitor, both elements behave in a similar way under temperature fluctuations.

In FIG. 4, a digital output 12 is represented along with a connection for the energy supply 13. This configuration consequently comprises contacts which have to be supplied or tapped by leads. The energy supply 13 is provided by the electrical or electronic components located under the housing 4. A data transmission to the outside can be achieved by means of the digital output 12. Depending on the configuration of the electronic component 14, measuring signals for the capacitance or for already calculated further variables, such as force, torque or the like, can consequently be transmitted to the outside.

In FIG. 3, both the digital output 12 and the energy supply 13 are replaced by the coil 16. This coil, likewise configured by planar technology, serves for the transmission and reception of electromagnetic waves. Measurement data in particular can be transmitted to the outside. In the opposite direction, the energy supply from the outside can be performed via the coil 16, for example into an energy buffer such as a capacitor or a storage battery. This contactless transmission offers major advantages with respect to the handling of a capacitive measuring system of this type. It is particularly advantageous in this respect to operate the energy transmission and data transmission alternately. In addition, the data transmission can be called up or started for example by an external request signal. The inquiry of the reference capacitance of the reference capacitor 15 can likewise take place in alternation with other operations.

Figure 5:
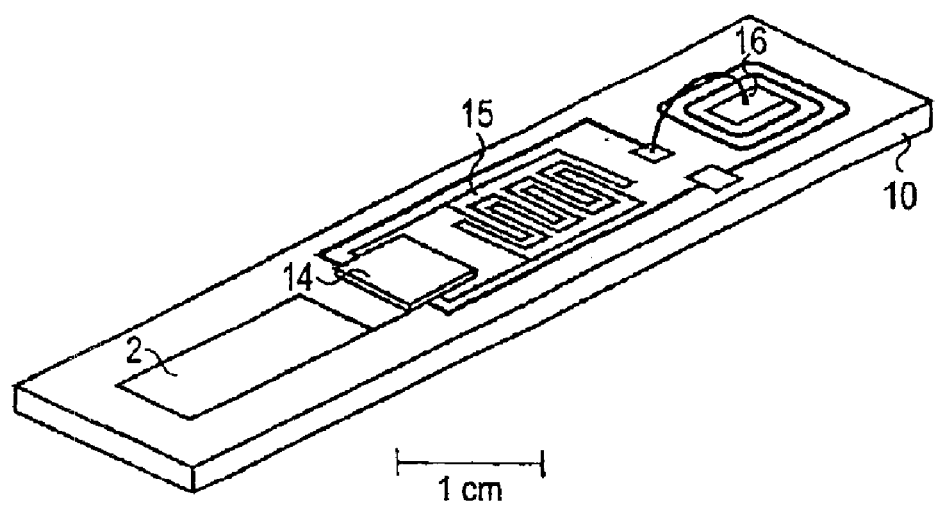
FIG. 5 shows a glass substrate 10 with a measuring electrode, reference capacitor and induction coil applied to it by planar technology and also an electronic component.

FIG. 5 shows a three-dimensional representation of a glass substrate 10. Represented on its surface are: measuring electrode 2, electronic component 14 in flip-chip technology, reference capacitor 15 and coil 16. This entire arrangement is configured in a planar form and likewise comprises internal wirings.

Figure 6:
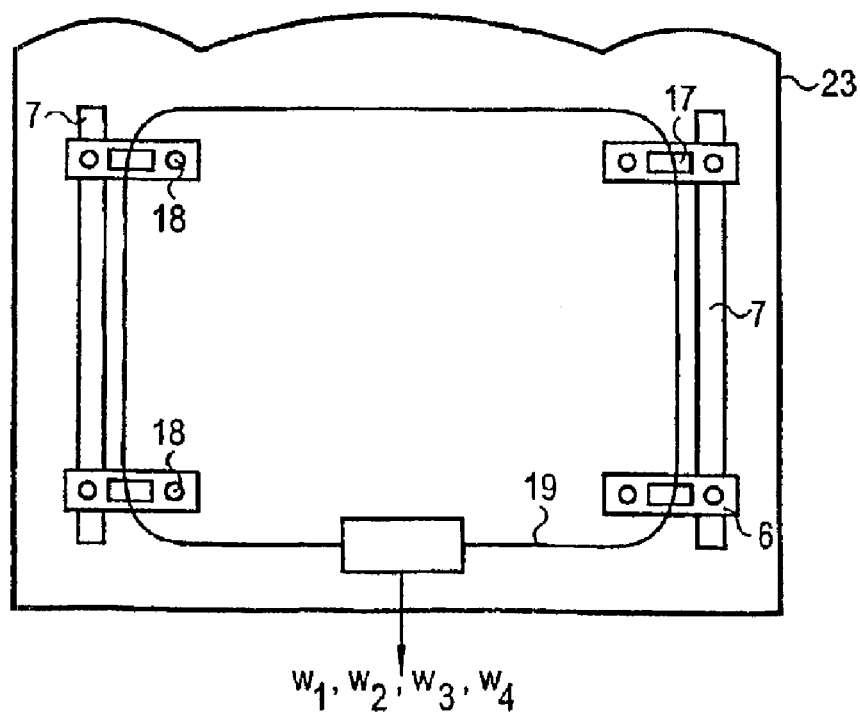
FIG. 6 schematically shows the plan view of a vehicle seat which is mounted on supports with fastening elements, which is represented as deforming elements with capacitive Microsystems.

FIG. 6 shows the use of capacitive microsystems 17 on a vehicle seat. The vehicle seat 23 is mounted on supports 7, with seat fastenings 18 being interposed. These seat fastenings 18 are represented as, or in conjunction with, deformation elements 6. There are consequently mechanical elements of known mechanical properties between the driver's seat 23 and its base support 7. Knowledge of the mechanical properties of the deforming elements 6 allows a statement to be made about the weight acting when the deforming element 6 bends or moves beyond a specific amount in a given system, for example over a specific length. With the capacitive measuring system 17, deflections of this type can be capacitively measured, can be transmitted to the outside and can be converted correspondingly into desired variables. As represented in FIG. 6, an induction loop 19 serves for the data transmission from the capacitive microsystems 17 or for the energy transmission for the systems. The data or the weights W1–4 can be correspondingly taken or inquired.

The system corresponding to the invention has, in particular, the following advantages:
 an unlimited number of load cycles or no effects of fatigue or aging,
 great overload resistance,
 easy mounting by just two spaced-apart fastening points,
 a linear, digital signal output, no individual calibration, no unwieldy aligning or mounting processes during production, production exclusively by standardized methods with commercially available components, contactless energy and signal transmission.

What is claimed is:

1. A capacitive microsystem for recording mechanical deformations comprising:

at least two flat electrodes set at acute angles with respect to each other, said electrodes comprising a measuring electrode and a counter electrode, wherein measuring signals result from changes in the capacitance when there is a corresponding change in the setting angle formed between the electrodes;

an elongate bending element having a support in the form of a beam and end regions connected to said support via bending regions;

at least one counter electrode rigidly connected to one end region of the bending element, said counter electrode interacts with the measuring electrode positioned on the support, wherein both the measuring electrode and a reference capacitor having been applied in a planar manner along with an electronic component to a glass substrate fastened on the support, and both measurement data and an energy supply being available via connections.

2. The capacitive microsystem as claimed in claim 1, wherein in addition to the connections on the glass substrate, the microsystem further comprises a coil produced by planar technology for measurement data and/or energy transmission.

3. The capacitive microsystem as claimed in claim 1, wherein the electronic component is provided by CMOS technology.

4. The capacitive microsystem as claimed in claim 1, wherein the electronic component is an unpackaged integrated circuit, applied by direct mounting.

5. The capacitive microsystem as claimed in claim 1, wherein at least the region-of the electrodes and of the glass substrate is covered by a hermetically sealing housing.

6. The capacitive microsystem as claimed claim 1, wherein the bending element can be connected to a deforming element via fastening points located in its end regions.

7. A method of operating a capacitive microsystem for recording mechanical deformations comprising:

detecting at least one of the mechanical deformations of a deforming element of know mechanical properties using the capacitive microsystem, wherein the capacitive microsystem includes:

at least two flat electrodes set at acute angles with respect to each other, said electrodes comprising a measuring electrode and a counter electrode, wherein measuring signals result from changes in the capacitance when there is a corresponding change in the setting angle formed between the electrodes;

an elongate bending element having a support in the form of a beam and end regions connected to said support via bending regions; and at least one counter electrode rigidly connected to one end region of the bending element, said counter electrode interacts with the measuring electrode positioned on the support, wherein both the measuring electrode and a reference capacitor having been applied in a planar manner along with an electronic component to a glass substrate fastened on the support, and both measurement data and an energy supply being available via connections; and calculating a force for the at least one of the mechanical deformations.

8. The method of claim 7, further comprising measuring a flexure of the deforming element brought about by the force of a weight.

9. The method of claim 8, further comprising:

forming seat fastenings for a vehicle seat into the deforming element fitted with capacitive microsystems; and measuring the weight on the vehicle seat.

10. A method of operating a capacitive microsystem for recording mechanical deformations comprising interrogating or charging a plurality of the capacitive microsystems with energy such that data and/or energy transmission is contactless and takes place via an external induction loop, wherein the capacitive microsystem includes:

at least two flat electrodes set at acute angles with respect to each other, said electrodes comprising a measuring electrode and a counter electrode, wherein measuring signals result from changes in the capacitance when there is a corresponding change in the setting angle formed between the electrodes;

an elongate bending element having a support in the form of a beam and end regions connected to said support via bending regions;

at least one counter electrode rigidly connected to one end region of the bending element, said counter electrode interacts with the measuring electrode positioned on the support, wherein both the measuring electrode and a reference capacitor having been applied in a planar manner along with an electronic component to a glass substrate fastened on the support, and both measurement data and an energy supply being available via connections on the glass substrate; and a coil produced by planar technology for measurement the date and/or the energy transmission is formed on the glass substrate.

11. A method of operating a capacitive microsystem for recording mechanical deformations comprising alternating an energy transmission from an induction loop to the capacitive microsystem and data transmission from the capacitive microsystem to the induction loop, wherein the capacitive microsystem includes:

at least two flat electrodes set at acute angles with respect to each other, said electrodes comprising a measuring electrode and a counter electrode, wherein measuring signals result from changes in the capacitance when there is a corresponding change in the setting angle formed between the electrodes;

an elongate bending element having a support in the form of a beam and end regions connected to said support via bending regions;

at least one counter electrode rigidly connected to one end region of the bending element, said counter electrode interacts with the measuring electrode positioned on the support, wherein both the measuring electrode and a reference capacitor having been applied in a planar manner along with an electronic component to a glass substrate fastened on the support, and both measurement data and an energy supply being available via connections on the glass substrate; and a coil produced by planar technology for measurement the data and/or the energy transmission is formed on the glass substrate.

* * * * *